US008321677B2

(12) United States Patent
Morten (10) Patent No.: US 8,321,677 B2
(45) Date of Patent: Nov. 27, 2012

(54) PRE-BINDING AND TIGHT BINDING OF AN ON-LINE IDENTITY TO A DIGITAL SIGNATURE

(75) Inventor: Glenn A. Morten, Bellevue, WA (US)

(73) Assignee: Google Inc., Mountain View, CA (US)

( * ) Notice: Subject to any disclaimer, the term of this patent is extended or adjusted under 35 U.S.C. 154(b) by 1129 days.

(21) Appl. No.: 11/534,161

(22) Filed: Sep. 21, 2006

(65) Prior Publication Data

US 2008/0126806 A1      May 29, 2008

(51) Int. Cl.
  *H04L 9/14*      (2006.01)
(52) U.S. Cl. ........... 713/176; 713/150; 713/168; 380/44
(58) Field of Classification Search .................. 713/150, 713/168, 176; 380/44
  See application file for complete search history.

(56) References Cited

U.S. PATENT DOCUMENTS

| | | | |
|---|---|---|---|
| 4,535,355 A | 8/1985 | Arn et al. | |
| 5,214,702 A * | 5/1993 | Fischer | 380/30 |
| 5,870,474 A | 2/1999 | Wasilewski et al. | |
| 5,991,399 A | 11/1999 | Graunke et al. | |
| 6,415,031 B1 | 7/2002 | Colligan et al. | |
| 6,823,454 B1 * | 11/2004 | Hind et al. | 713/168 |
| 6,826,690 B1 * | 11/2004 | Hind et al. | 713/186 |
| 6,952,773 B2 * | 10/2005 | Wheeler et al. | 713/170 |
| 7,007,170 B2 | 2/2006 | Morten | |
| 7,203,837 B2 * | 4/2007 | O'Shea et al. | 713/170 |
| 7,269,256 B2 * | 9/2007 | Rosen | 380/44 |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0089410 A1 | 7/2002 | Janiak et al. | |
| 2002/0104004 A1 | 8/2002 | Couillard | |
| 2002/0141582 A1 | 10/2002 | Kocher et al. | |

(Continued)

FOREIGN PATENT DOCUMENTS

EP      0886409      12/1998

(Continued)

OTHER PUBLICATIONS

Jessica E. Vascellaro, "New Ways to Prove You are Who You Say You Are Online," Wall Street Journal, Aug. 3, 2006, at D1.

(Continued)

*Primary Examiner* — Kambiz Zand
*Assistant Examiner* — Tongoc Tran
(74) *Attorney, Agent, or Firm* — Frommer Lawrence & Haug LLP; John W. Branch (57) ABSTRACT

A method, apparatus, and system are directed towards generating a public/private key pair prior to registration. The generation of the public/private key pair is performed by the entity to which the key pair is to be associated. The entity may then complete n application. The entity may then employ the generated public/private key pair to digitally sign the application. In one embodiment, the public key is provided with the application to a registration authority. Upon request, the public key and at least some of the application information may be provided to requester for use in identification, authentication, integrity, and/or non-repudiation of the registered entity. In another embodiment, the registration authority or other entity may verify the identity of the registering entity using the application. In one embodiment, the registration authority may select to digitally sign the application to indicate that the information has been verified.

16 Claims, 5 Drawing Sheets

U.S. PATENT DOCUMENTS

| | | | |
|---|---|---|---|
| 2002/0152384 A1* | 10/2002 | Shelest et al. | 713/176 |
| 2003/0110383 A1* | 6/2003 | Garay et al. | 713/176 |
| 2006/0224470 A1* | 10/2006 | Garcia Ruano et al. | 705/27 |
| 2007/0074033 A1* | 3/2007 | Adams et al. | 713/176 |
| 2008/0022122 A1* | 1/2008 | Parkinson et al. | 713/185 |
| 2008/0184029 A1* | 7/2008 | Sims et al. | 713/156 |
| 2008/0304669 A1* | 12/2008 | Bugbee | 380/278 |

FOREIGN PATENT DOCUMENTS

| | | |
|---|---|---|
| WO | WO-01/93212 A2 | 12/2001 |

OTHER PUBLICATIONS

RFC 2459, R. Housely et al. (Jan. 1999) 105 pages "Internet X.509 Public Key Infrastructure Certificate and CRL Profile".

RFC 2246, T. Dierks et al. (Jan. 1999) 60 pages "The TLS Protocol Version 1.0".

RFC 793, Information Sciences Institute at USC (Sep. 1981) 84 pages, "Transmission Control Protocol, DARPA Internet Program, Protocol Specification".

Wu, Tsung-Li et al., Selective Encryption and Watermarking of MPEG Video (Extended Abstract), Feb. 17, 1997, 10 pgs., International Conference on Image Science, Systems, and Technology.

* cited by examiner

PRE-BINDING AND TIGHT BINDING OF AN ON-LINE IDENTITY TO A DIGITAL SIGNATURE

BACKGROUND OF THE INVENTION

This invention relates generally to computing security, and more particularly but not exclusively, to tightly pre-binding of an on-line identity to a digital signature.

Today, proving who you are and/or with who you may be communicating with on-line is becoming increasingly more important. It is of particular concern in such on-line activities as e-commerce, on-line dating, social networking activities, and the like. Unfortunately, all too often, an individual or entity with which you may be communicating may not be whom you had expected. Such fraudulent misrepresentations are making it more difficult to know whom to trust on-line. It is also making many users reduce their use of on-line activities. Such reduction financially impacts many on-line companies.

In response, may on-line companies have attempted to create new tools to help people to confirm their identities, and to validate the identities of those with whom they may be communicating. Typical solutions attempt to bind an identity of a person or entity with a digital signature. This is typically achieved by having the person or entity complete an application that includes selected information about the entity. This action is commonly known as registration of the entity. The selected information is typically provided to another entity, such as a registration authority, or the like, that then uses the selected information to verify the identity of registering entity. This may be performed by searching a database, such as a motor vehicle database, a merchant database, a financial database, a credit database, or the like. If the identity can be verified to some level of confidence by the registration authority, the registration authority may then provide the registering entity with a private key generated from a public/private key generation algorithm. The registering entity may then use the private key to digitally sign messages, and other digital material. The digital signature is intended to provide a level of confidence that the message is from a known entity.

However, the above approach leaves open several security concerns. For example, as described above, the delivery of the private key by the registration authority may be open to a man in the middle attack, and interception. That is, an unauthorized party may access and use the private key to impersonate the registering entity or even the registration authority. Moreover, because the registration authority has access to the private key, it may be hacked, improperly distributed, or the like. Again, this leaves open the possibility of impersonation of the registering entity. This means that the confidence in having received a message from the registering entity may be significantly reduced. In addition, the time and effort often required to complete the registration process may be an obstacle to many entities, resulting in a further barrier to digital signature usage for on-line activities, and further resulting in loss of potential e-commerce opportunities. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "digital certificate" refers to a digital document that binds a public key to an entity, where an entity may be any of a person, an organization, a business, an institution, a device, or even a group of devices. The digital certificate may be used to authenticate or verity an identity of the entity. A typical digital certificate may include the public key, a name or other identifier of the entity to be associated with the public key, an expiration date, and a name of a certification authority or other certifying entity. A digital certificate may also include other information, such as a digital signature of the certification authority or other certifying entity. One type of digital certificates is described by Housley, R., W. Ford, W. Polk and D. Solo, in "Internet X.509 Public Key Infrastructure: Certificate and CRL Profile", Request for Comments (RFC) 2459, January 1999, which is available through the Internet Engineering Task Force (IETF), and is hereby incorporated by reference. The invention, however, is not restricted to digital certificates being issued by certification authorities, and other digital certificates may also be employed. For example, digital certificates based on a web of trust, or the like, may also be employed. In another embodiment of the invention, public keys may be made available independent of a digital certificate.

Typically, a message may be encrypted using symmetric encryption/decryption algorithms. Symmetric algorithms are so called because the same key is used to encrypt and to decrypt the message. That is, the message sender and the message recipient share the key. This shared key is herein referred to as the symmetric key. Common symmetric algorithms include Data Encryption Standard (DES), RC2, RC4, Advanced Encryption Standard (AES), and International Data Encryption Algorithm (IDEA).

Symmetric key distribution, creation of digital signatures, and other activities, are typically performed using asymmetric encryption/decryption algorithms that use public/private key pairs. Asymmetric algorithms are sometimes referred to as public key algorithms. In asymmetric or public key algorithms, the key pairs are mathematically related to each other so that data that is encrypted using one key can only be decrypted with the other key. It is expected that the owner of one key (the private key) keeps that key private from others, and publicly distributes the second key (public key). In one embodiment, the public key may be distributed through the use of a digital certificate. However, public keys may also be distributed using a variety of other mechanisms. Common asymmetric algorithms include Elliptic curve cryptography (ECC), ElGamal, and RSA. Pretty Good Privacy (PGP) is an example of a system that uses both public key and symmetric key algorithms, and includes a system which binds the public keys to entity identities.

As used herein, a digital signature refers to a cryptographically based signature assurance scheme. Typically, a digital signature is used to provide, with a high degree of confidence, authentication of a message sender, that the message received was not modified from that of a message sent (message integrity), and non-repudiation by the message sender.

Typically, to create a digital signature for a message, a message sender computes a message digest using for example, a one-way hash algorithm. Briefly, a message digest may be thought of as a fingerprint of the message. The message digest is then encrypted using the sender's private key to produce what is known as the digital signature. The message is then typically sent along with the digital signature. Verification of the digital signature usually involves decrypting the digital signature using a public key of the message sender to recover the message digest. The message digest for the received message is then computed using the same algorithm as the digital signature used. A comparison is then performed between the two message digests. If the received message was not altered from the originally sent message, the calculated message digest and the recovered message digest should be equal.

The term "network connection" refers to a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in RFC 793, which is available though the IETF.

A secure connection may be established using any of a variety of secure communications protocols that employ certificates, including SSL, TLS, or the like. The SSL protocol is described in Netscape Communications Corp, Secure Sockets Layer (SSL) version 3, (November 1996), which is available through Netscape Communications Corp. The TLS protocol is derived from SSL, and is described in Dierks, T., and Allen, C., "The TLS Protocol Version 1.0," RFC 2246 (January 1999), which is available through the IETF. As used throughout this application, including the claims, SSL refers to SSL, TLS, and all secure communications protocols derived therefrom. The SSL protocol may provide security for application layer protocols such as HyperText Transfer Protocol (HTTP), Lightweight Directory Access Protocol (LDAP), Internet Messaging Access Protocol (IMAP), Post Office Protocol (POP), Session Initiation Protocol (SIP), or the like. For example, HTTP over SSL (HTTPS) utilizes the SSL protocol to secure HTTP data. The SSL protocol may utilize TCP/IP on behalf of the application layer protocols to transport secure data.

Briefly, the present invention is directed towards a method, apparatus, and system for addressing the security concerns described above, as well as others, by generating a public/private key pair prior to registration. In one embodiment, the generation of the public/private key pair is performed by the entity to which the key pair is to be associated. The entity may then request, or otherwise obtain and complete a registration application. In one embodiment, the registration application includes information about the identity of the entity. The entity may represent a person, an organization, an institution, a business, a device, a group of devices, or the like. In any event, the entity may then employ the generated public/private key pair to digitally sign the registration application. In one embodiment, the public key is provided with the registration application, and is digitally signed as well. The signed registration application may then be provided to a registration authority, or the like. In one embodiment, the public key is also provided to the registration authority, or other entity. In one embodiment, communications between the registering entity and the registration authority is performed over a secure communications, such as an SSL/TLS connection, or the like.

In one embodiment, for example, in low risk transactions, the registration application along with the public key provides a source of unverified certificates for the registered entity. That is, in one embodiment, upon request, the public key and at least some of the registration application information may be provided to a requester for use in identification, authentication, integrity, and/or non-repudiation of the registered entity. In another embodiment, the registration authority or other entity may employ at least some of the information in the registration application to verify the identity of the registering entity. In one embodiment, the registration authority may select to add information that indicates that the registering entity's identity is verified by the registration authority. In another embodiment, the registration authority may select to digitally sign the registration application, or some of the provided information, to indicate that the information has been verified. In yet another embodiment, the registration authority may provide at least some of the verified information upon request using any of a variety of mechanisms.

Illustrative Environment

Figure 1:
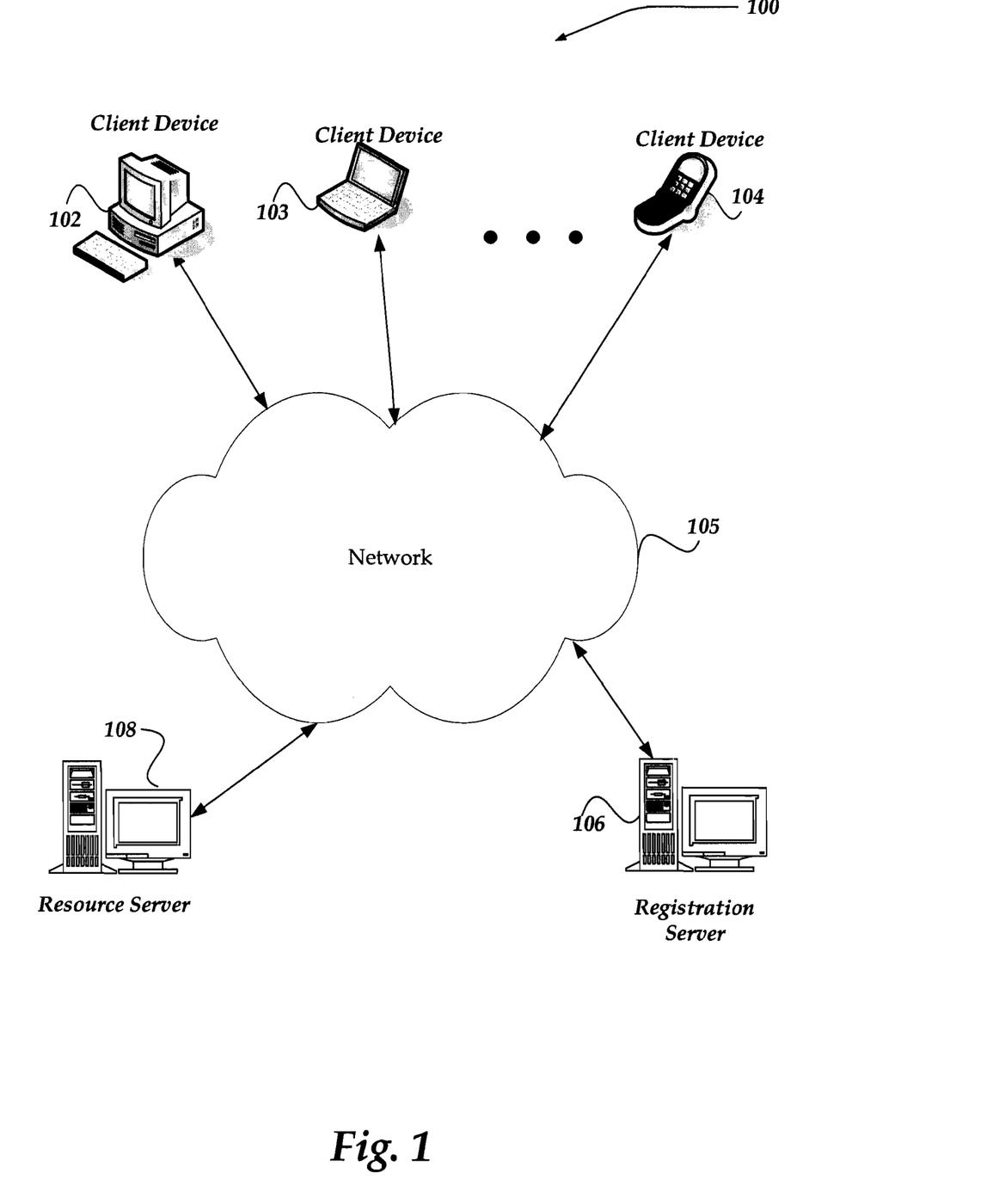
FIG. 1 shows a functional block diagram illustrating an environment for practicing the invention.

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, resource server

108, and Registration server 106. Client devices 102-104 are in communication with each other, resource server 108, and Registration server 106 through network 105. Resource server 108 and registration server 106 may also be in communication with each other through network 105.

One embodiment of a client device is described in more detail below in conjunction with FIG. 2. Briefly, however, client devices 102-104 may include virtually any computing device capable of receiving and sending a message over a network, such as network 105, to and from another computing device. The set of such devices described in an exemplary embodiment below generally includes mobile devices that are usually considered more specialized devices with limited capabilities and typically connect using a wireless communications medium such as cell phones, smart phones, pagers, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML). In one embodiment, client devices 102-104 may employ the browser, or another application to establish a secure connection over network 105 with another network device, such as registration server 106, or the like.

Client devices 102-104 may further include a key manager, as described below in conjunction with FIG. 2, to enable the client device to generate digital encryption/decryption keys, and to employ the generated keys to encrypt/decrypt data, and/or to digitally sign data. In one embodiment, the key manager may be integrated with the browser.

Network 105 is configured to couple client devices 102-104, with other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102-104, registration server 106, and/or resource server 108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Resource server 108 includes virtually any network computing device that is configured to provide various resources, including content and/or services over network 105. Resource server 108 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, web pages, IM, or the like.

Typically, resource server 108 may include an interface that may request sensitive information from a user of client device 102-104. For example, resource server 108 may provide access to an account, which may request user log-in information. Such log-in information may include a user name, password, an entry of a key number, or the like. In another example, resource server 108 may request and/or provide other sensitive information, such as a credit card number, medical information, or the like. For example, resource server 108 may operate as a merchant site that on at least one webpage of its website, there is a request for entry of sensitive information, including financial information, or the like. In another embodiment resource server 108 may operate as a bank, or other financial institution, and as such, may be configured to provide sensitive information upon request, including financial information. Thus, in one embodiment, resource server 108 may provide information that may be used to verify that resource server 108 is what it claims to be. In another embodiment, resource server 108 may request information that may be used to verify that the entity with which it is communicating is what it claims to be. In one embodiment, the information provided and/or requested to perform the verification may include a digitally signed message, a request for a digital certificate, or the like.

Moreover, in at least one embodiment, resource server 108 may include a data store that may be used to verify a registering entity. For example, resource server 108 may include a motor vehicle data store, a merchant data store, a financial data store, a credit data store, an education data store, or the like.

Devices that may operate as resource server 108 include, but are not limited to personal computers, desktop computers, multiprocessor systems, microprocessor-based or programmable consumer electronics, network PCs, servers, network appliances, and the like.

One embodiment of registration server 106 is described in more detail below in conjunction with FIG. 3. Briefly, however, registration server 106 includes virtually any network device that is configured to enable an entity to register an identity. In one embodiment, registration server 106 may be configured to provide a registration application to the registering entity. As noted, above, the registering entity may include, but is not limited to, client devices 102-104, and resource server 108. In one embodiment, communications with the registering entity may be over a secure connection, such as through SSL/TLS, or the like. In one embodiment, communications with the registering entity may be through a web interface. In one embodiment, the web interface may be over a secure connection, such as through HTTPS, or the like.

Registration server 106 may be configured to receive the registration application from the registering entity, where the registration application is digitally signed by the registering entity. In one embodiment, registration server 106 may also be configured to receive a public key from the registering entity.

Registration server 106 may be configured to search at least one data store to verify the content of the registration application. In one embodiment, registration server 106 may be configured to employ a variety of data stores, including, but not limited to a motor vehicle data store, a merchant data store, a financial data store, a credit data store, or the like. If the information is verified, in one embodiment, registration server 106 may digitally sign at least some of the information, and/or generate a digital certificate with at least some of the information, the provided public key, or the like. Registration server 106 may employ a process substantially similar to process 500 described below in conjunction with FIG. 5 to perform at least some of its actions.

Devices that may operate as registration server 106 include, but are not limited to personal computers, desktop computers, multiprocessor systems, microprocessor-based or programmable consumer electronics, network PCs, servers, network appliances, and the like.

Although Registration server 106 is illustrated as a single network device, the invention is not so limited. For example, a plurality of network devices may be configured such that the operational aspects of registration server 106 may be distributed over the plurality of network devices.

Illustrative Client Device

Figure 2:
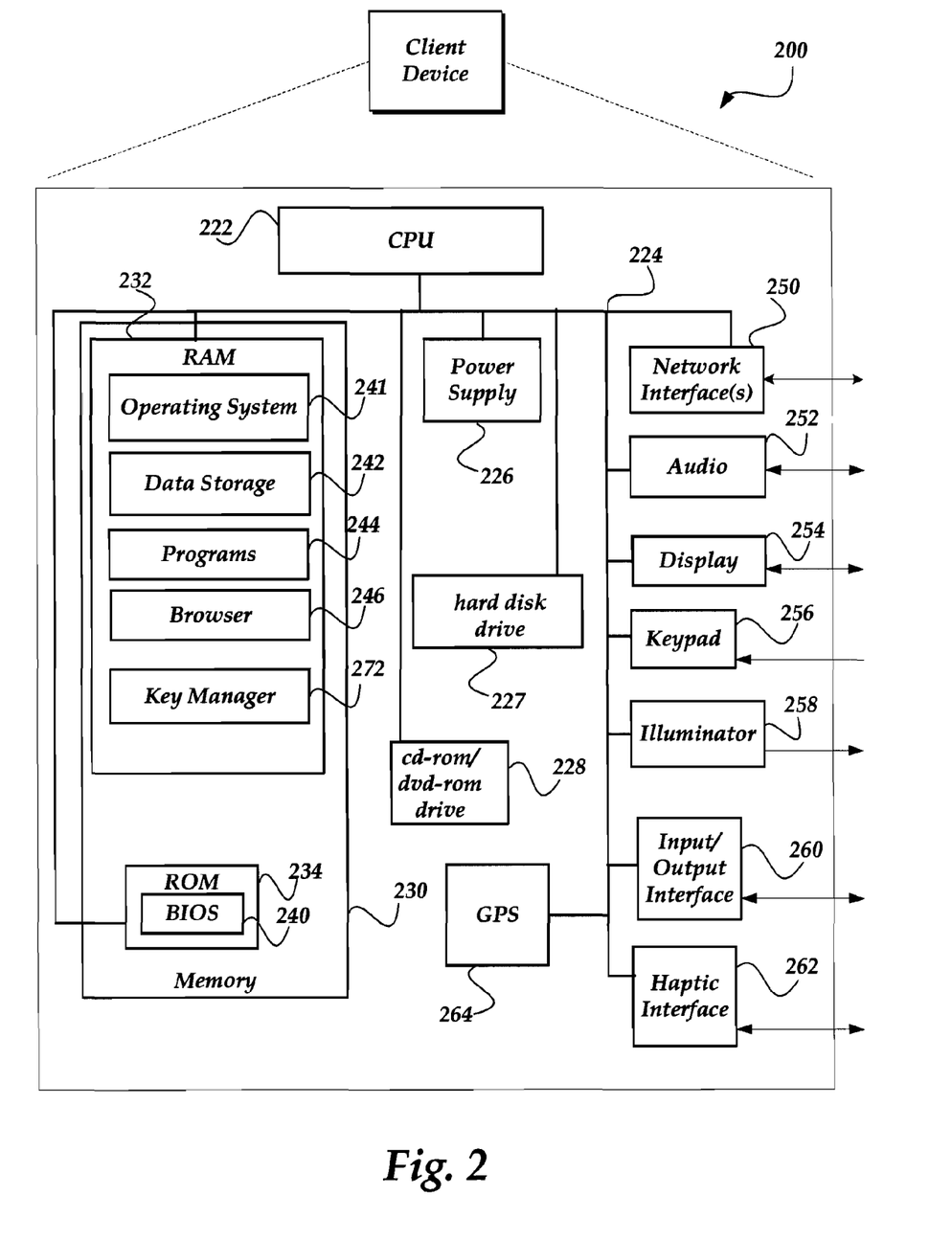
FIG. 2 shows one embodiment of a client device that may be employed by a registering entity.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as CD-ROM/DVD-ROM drive 228 and hard disk drive 227. Hard disk drive 227 is utilized by client device 200 to store, among other things, application programs, databases, and the like. Additionally, CD-ROM/DVD-ROM drive 228 and hard disk drive 227 may store cookies, data, images, or the like.

Keypad 256 may comprise any input device arranged to receive input from a user (e.g. a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user (e.g. a sender) of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like. Moreover data storage 242 may be used to store information such as data received over a network from another computing device, data output by a client application on client device 200, data input by a user of client device 200, or the like. For example, data storage 242 may include data, including cookies, forms, and/or other client device data sent by a network device. Data storage 242 may also include image files, content, digital certificates, digital encryption/decryption keys, or the like, for display and/or use through various applications. Moreover, although data storage 242 is illustrated within memory 230, data storage 242 may also reside within other storage mediums, including, but not limited to CD-ROM/DVD-ROM drive 228, hard disk drive 227, or the like.

Programs 244 may also include computer executable instructions which, when executed by client device 200, transmit, receive, and/or otherwise process messages and enable telecommunication with another user of another client device. Other examples of application programs include calendars, contact managers, task managers, transcoders, database programs, word processing programs, spreadsheet programs, games, security programs, encryption applications, CODEC programs, and so forth. In addition, mass memory 230 stores browser 246, and key manager 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. Browser 246 may also be configured to communicate using a secure connection, such as through HTTPS, or the like.

Similarly, browser 246 may be configured to receive, store, and/or provide data. For example, in one embodiment, browser 246 may receive and store client device data in the form of a cookie, or the like. In one embodiment, browser 246 may also provide the client device data, forms, or the like, over a network from another networked device. Browser 246 may be further configured to manage and store digital certificates for use in providing to another network device, upon request. In one embodiment, browser 246 may be configured to employ a digital key to digitally sign information.

Key manager 272 is configured to generate and manage digital encryption keys. For example, key manager 272 may be configured to generate a public/private key pair using any of a variety of mechanisms, including those discussed above. Key manager 272 may also be configured to generate a symmetric key using any of a variety of mechanisms, including those discussed above. In one embodiment, may generate a private key associated with an asymmetric key pair such that the private key is bound to the client device 200. For example, in one embodiment, the key manager 272 may employ one or more unique and/or identifiable elements associated with client device 200 in which the key generation is performed. Examples of such elements include, but are not limited to, a Central Processing Unit's (CPU's) kernel calculated speed, CPU serial number, CPU family identity, CPU manufacturer, an operating system globally unique identifier (GUID), hardware component enumerations, Internet Protocol (IP) address, BIOS serial number, disk serial number, kernel version number, operating system version number, operating system build number, machine name, installed memory characteristic, physical port enumeration, customer supplied ID, MAC address, and the like.

Key manager 272 may be further configured to provide a secure store for the generated private key, and/or symmetric key. In one embodiment, key manager 272 may employ a separate secure store, such as a secure component within data storage 242.

Key manager 272 may also be configured to provide access to one of more of the generated keys for use in encrypting data, decrypting data, and/or digitally signing data. In one embodiment, key manager 272 may also provide a public key to be sent to another network device. Key manager 272 may provide the public key within, such as a digital certificate, or the like. In one embodiment, key manager 272 may select to digitally sign the digital certificate using the private key associated with the public key. In one embodiment, key manager 272 may provide the digital certificate to browser 246 upon request.

Figure 5:
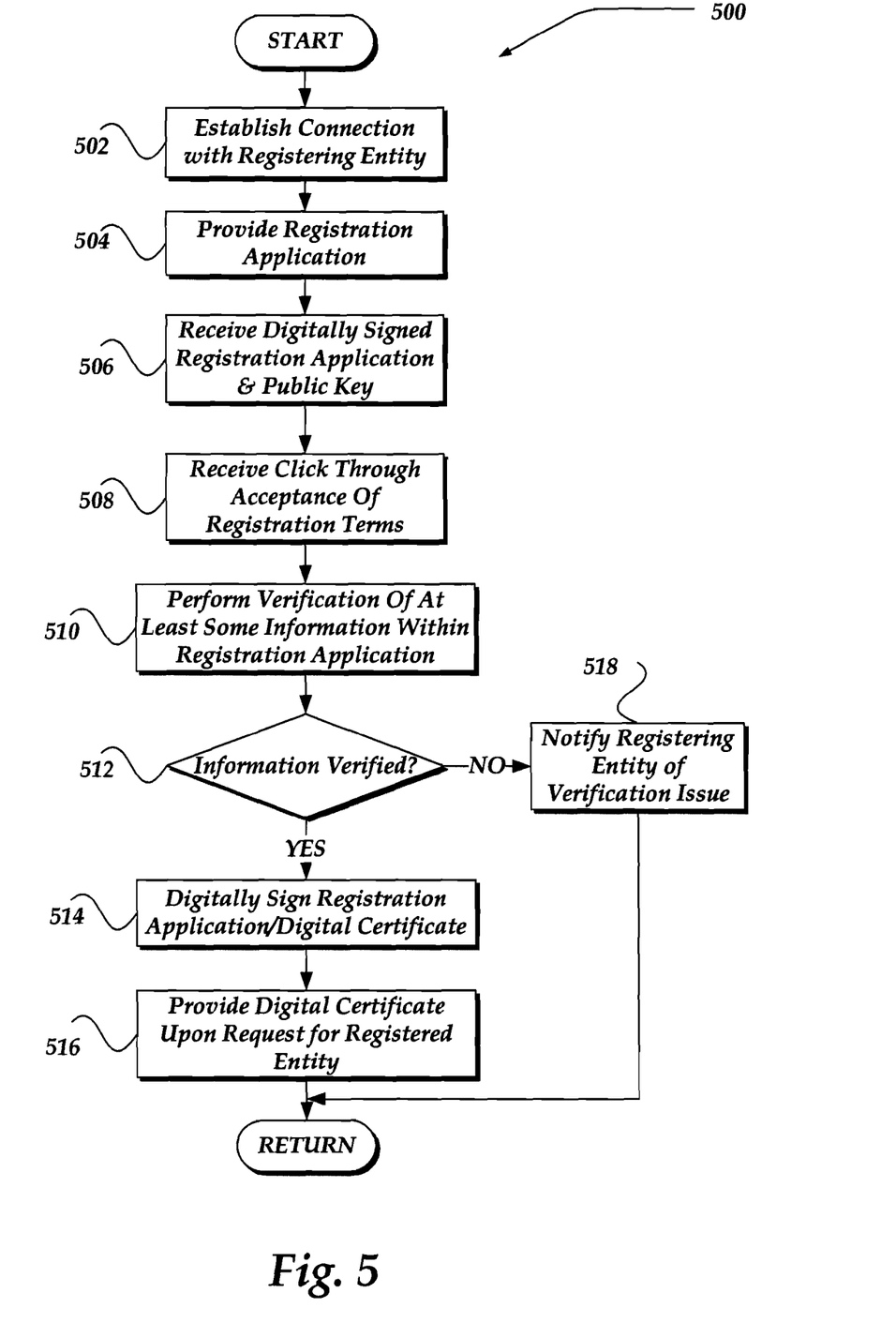
FIG. 5 illustrates a flow diagram generally showing one embodiment for a registration authority process for use in registering a tightly pre-bound identity of an entity, in accordance with the present invention.

In one embodiment, key manager 272 may operate to perform its actions independent of browser 246. In another embodiment, key manager 272 may operate within browser 246, or even accessed through browser 246, and/or another application. In one embodiment, key manager 272 may be substantially similar to PGP key managers, or the like. However, the invention is not so limited, and virtually any key management mechanism may be employed. In any event, key manager 272 may employ a process substantially similar to process 500 below to perform at least some of its actions.

Illustrative Server Environment

Figure 3:
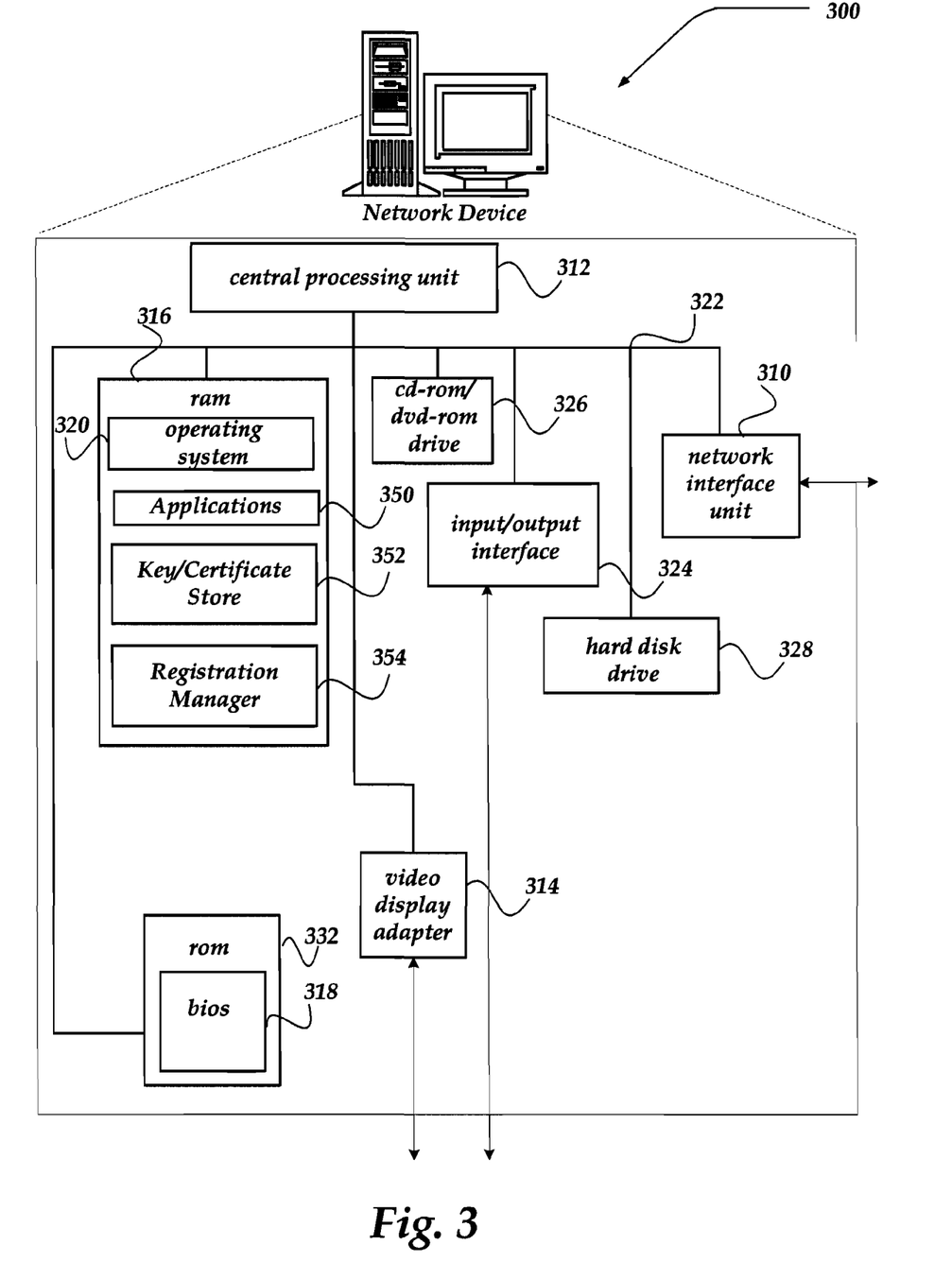
FIG. 3 shows one embodiment of a network device that may be employed by a registration authority.

FIG. 3 shows one embodiment of a network device, according to one embodiment of the invention. Network device 300 may include many more or less components than those shown. For example, network device 300 may operate as a network appliance without a display screen. The components shown, however, are sufficient to disclose an illustrative embodiment for practicing the invention. Network device 300 may, for example, represent registration server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as CD-ROM/DVD-ROM drive 326 and hard disk drive 328. Hard disk drive 328 is utilized by network device 300 to store, among other things, application programs, databases, digital certificates, or the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, security programs, web servers, and so forth. Mass storage may further include applications such key/certificate store 352, and registration manager 354.

Key/certificate store 352 may include virtually any mechanism that is configured to store public keys, and/or digital certificates for access by another entity. As such, key/certificate store 352 may include data bases, files, programs, scripts, or the like.

Registration manager 354 is configured to enable a registering entity to provide information that may be stored in key/certificate store 352. In one embodiment, at least some of the information may be stored along with a public key from the registering entity within a digital certificate. In one embodiment, registration manager 354 may attempt to verify at least some of the information provided by the registering entity. If the information may not be verifiable, registration manager 354 may be further configured to provide notice to the registering entity, and/or decline to store the public key for access by requesting entity. In one embodiment, registration manager 354 may also select to store the public key, along with the information without verifying the information. In one embodiment, registration manager 354 may store and/or provide the unverified information, and/or public key, within additional information that indicates that the provided information is not verified. In one embodiment, registration manager 354 may communicate with the registering entity over a secure connection. In addition, registration manager 354 may perform its actions using, at least in part, process 500 described below.

Generalized Operation

Figure 4:
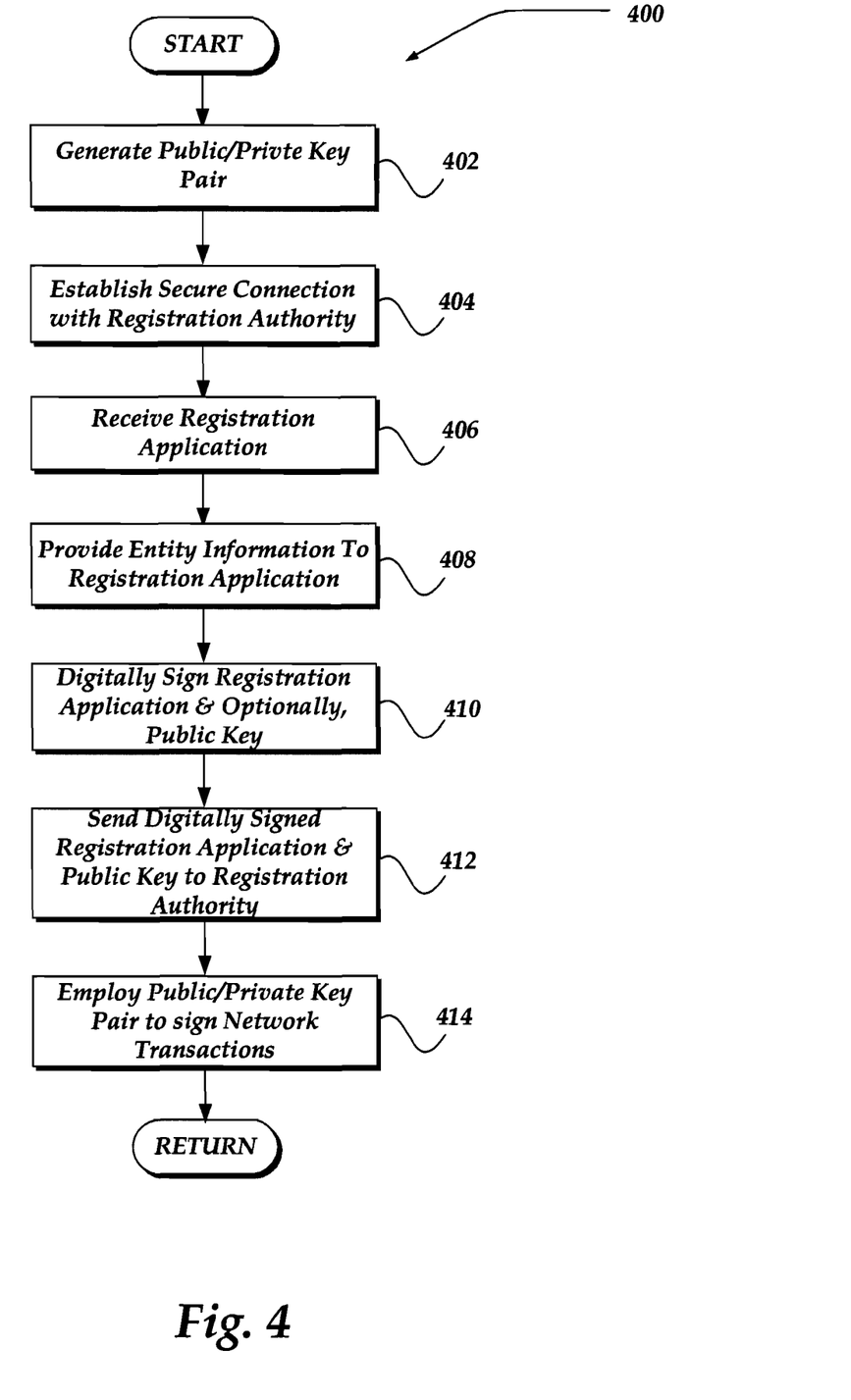
FIG. 4 illustrates a flow diagram generally showing one embodiment for a client process of tightly pre-binding an identity of an entity to a digital signature.

The operation of certain aspects of the invention will now be described with respect to FIGS. 4-5. FIG. 4 illustrates a flow diagram generally showing one embodiment for a client process of tightly pre-binding an identity of an entity to a digital signature. Process 400 of FIG. 4 may be performed by client devices 102-104, and/or resource server 108 of FIG. 1.

Process 400 begins, after a start block, at block 402, where a registering entity generates a public/private key pair on the registering device. The registering entity may employ any of a variety of mechanisms to generate the key pair, including PGP, or any of the above mechanisms described above.

Processing then proceeds to block 404, where the registering entity may then establish a connection over a network with a registration entity, such as registration server 106 of FIG. 1. In one embodiment, the connection is a secure connection, using such as SSL/TLS, HTTPS, or the like. In one embodiment, the connection may be established using a web browser, however, the invention is not so limited, and any of a variety of communication protocols may be employed, including, but not limited to email, FTP, or the like. In any event, process 400 flows next to block 406, where the registering entity may receive a form, web page, document, or other type of registration application. In one embodiment, the registering entity receives a request for information to be provided to register the entity. The information requested may include a variety of information, including, but not limited to, an identifier of the registering entity, an address, and/or other information that may be employed to uniquely identify the registering entity. In one embodiment, the information may include information that may be considered sensitive and known to a restricted number of other entities. For example, in one embodiment, the sensitive information may include a motor vehicle number, a social security number, financial information, medical information, or the like. Such information may be provided during block 408. Moreover, during block 408 the registering entity may be provided a document of terms for which the registering entity is expected to accept. In one embodiment, acceptance may be performed using a 'click through' agreement mechanism.

Process 400 proceeds next to block 410, where the registering entity employs the private key generated at block 402 to digitally sign at least some of the provided information. In one embodiment, the registering entity may digitally sign the registration application completely, or a portion of the application that includes at least some of the provided information. In one embodiment, the registering entity may also digitally sign the public key.

Processing continues to block 412, where the digitally signed registration application and the public key may be sent over the network to the registration entity.

Processing then flows to block 414, where registering entity may employ the digital keys to sign various network transactions, including emails, requests for purchases, and/or other communications. In one embodiment, the registering entity may also provide information about the registration entity, so that the other party with which the registering entity is communicating may access the public key, digital certificate, or the like, to confirm identity, authenticity, and/or integrity of communications from the registering entity. Process 400 may then return to another to a calling process to perform other actions.

As noted above, because the asymmetric key pair is generated by the registering entity, preferably on a device of the registering entity, the access to the private key is restricted to the registering entity. Moreover, because the private key is used to sign the registration application, the information provided in the registration application is tightly bound to the identity and the digital signature. Any verification process subsequently performed further validates the information within the registration application.

FIG. 5 illustrates a flow diagram generally showing one embodiment for a registration entity process for use in registering a tightly pre-bound identity of an entity. Process 500 of FIG. 5 may be implemented within registration server 106, for example, of FIG. 1.

Process 500 begins, after a start block, at block 502, where a connection may be established with a registering entity. As noted above, the connection, may be a secure connection, in one embodiment. Moreover, the connection may employ web page interfaces, email, FTP, or any of a variety of other networking communication protocols.

Processing flows next to block 504, where a registration application may be provided to the registering entity. At block 506, the registration application may then be received from the registering entity with at least some information about the registering entity included. In one embodiment, the registration application may be digitally signed by a private key of the registering entity. Moreover, in one embodiment, the public key associated with the private key of the registering entity may also be received. In one embodiment, the public key may also be digitally signed.

Processing flows next to block 508, where the registering entity may be provided a click through contract for acceptance of registration terms. In one embodiment, the click through agreement may be provided during block 504, or even before block 504. In one embodiment, acceptance of the registration terms may be performed using any of a variety of other mechanisms. In any event, if the terms are accepted, processing continues to block 510; otherwise, processing may be terminated.

At block 510, in one embodiment, the registration entity may select to perform a verification of at least some of the information provided by the registering entity. In one embodiment, verification of the information might not be performed. Thus, in one embodiment, if verification is not to be performed, processing may loop to block 514. However, if verification is performed, processing continues to decision block 512, where a determination is made whether the information is verified. If not, processing proceeds to block 518 where a notice may be provided to the registering entity indicating that verification was not successful. In one embodiment, registration may be considered to have failed, and processing returns to perform other actions.

However, if verification is successful, processing flows to block 514, where, in one embodiment, the registration entity may select to digitally sign at least some of the information, along with the provided public key. In one embodiment, the registration entity may generate a digital certificate based on at least some of the information and/or public key. In one embodiment, the digital certificate, public key, and/or provided information may be stored until a request for such information is received, such as at block 516. At block 516, when a request for information associated with the registering entity is received, the digital certificate may be provided, and/or the public key associated with the registering entity may also be provided. In one embodiment, at least some of the provided information about the registering entity may also be provided. Upon completion of block 516, processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for binding an on-line identity to a digital signature, comprising:

generating, at a first device, a digital asymmetric key pair associated with each user of the first device, wherein the asymmetric key pair includes a private key and a public key;

receiving, at the first device, information for use in registering a user of the first device with a second device, wherein the information includes user identifying information other than the public key;
digitally signing, at the first device, at least some of the information about the user of the first device using the private key generated at the first device;
providing the digitally signed information to the second device;
providing the public key to the second device, wherein the second device decrypts the digitally signed information using the public key, verifies at least some of the information with a data store, and digitally signs the information with a second private key associated with the second device;
employing the second device to provide at least the user identifying information to a registration authority;
employing the second device to store a digital certificate that includes the public key associated with each user of the first device and the user identifying information if the registration authority verifies the identity of each user of the first device based on at least the provided user identifying information;
employing the private key, at the first device, to digitally sign a message to be communicated over a network to a third device; and
providing, from the first device, information to the third device enabling the third device to retrieve, from the second device, the information digitally signed with the second private key to verify that the message is associated with the first device.

2. The method of claim 1, wherein the private key is bound to the first device by employing at least one of the following characteristics of the first device in the generation of the digital asymmetric key pair: a Central Processing Unit's (CPU's) kernel calculated speed for the first device, CPU serial number, CPU family identity, CPU manufacturer, an operating system globally unique identifier (GUID), a hardware component enumeration, a Internet Protocol (IP) address, a BIOS serial number, a disk serial number, a kernel version number, an operating system version number, an operating system build number, a machine name, an installed memory characteristic, a physical port enumeration, a customer supplied ID, or a MAC address.

3. The method of claim 1, wherein providing the information further comprises employing a 'click through' acceptance of terms.

4. The method of claim 1, further comprising:
upon request, providing the digitally signed information to the third device.

5. A non-transitory computer-readable storage media configured to include program instructions for performing the method of claim 1.

6. An apparatus for binding an on-line identity to a digital signature over a network, comprising:
a transceiver to send and receive data over the network;
program code that is operative to perform actions, including:
generating, on the apparatus, a digital asymmetric key pair associated with each user of the apparatus, wherein the asymmetric key pair includes a private key and a public key which are bound to the apparatus;
registering an identity of the user by providing over the network at least some digitally signed information other than the generated public key about the identity of a user from the apparatus to a registration entity, wherein the information is digitally signed using the private key and includes user indentifying information other than the public key;
providing the public key from the apparatus to the registration entity;
enabling the registration entity to:
decrypt the digitally signed information,
verify at least some of the information with a data store, and
digitally sign the information with a second private key associated with the registration entity;
providing at least the user identifying information to a registration authority;
storing a digital certificate that includes the public key associated with each user of the apparatus and the user identifying information if the registration authority verifies the identity of each user of the apparatus based on at least the provided user identifying information;
employing the private key, at the apparatus, to digitally sign a message communicated over a network to a third device; and
providing, from the apparatus, information to the third device enabling the third device to retrieve, from the second device, the public key, to verify that the message is associated with the registered identity.

7. The apparatus of claim 6, wherein providing the digitally signed information further comprises, providing the information in response to a request to register the identity with a registration entity and optionally clicking through an acceptance of terms agreement.

8. The apparatus of claim 6, wherein providing over the network digitally signed information further comprises employing a secure connection.

9. The apparatus of claim 6, wherein enabling access to the digitally signed information further comprises:
if a registration entity determines that the information is verified, enabling the registration entity to digitally sign the digitally signed information or the public key.

10. A system for binding an on-line identity to a digital signature over a network, the system comprising:
a client device that is operative to perform actions, including:
generating a digital asymmetric key pair associated with each user of the client device, wherein the asymmetric key pair includes a private key and a public key;
receiving, at the client device, an application for use in registering an identity of a user;
digitally signing the application using the private key generated at the client device, wherein the digitally signed application includes user identifying information about the on-line identity other than the public key; and
providing over the network to a registration device, the digitally signed application, and the public key;
the registration device that is operative to perform actions, including:
establishing a secure connection with the client device;
providing over the secure connection the application to the client device;
receiving the digitally signed application and the public key over the secure connection from the client device;
decrypting the digitally signed application using the public key;
verifying at least some of the application with a data store;
providing at least the user identifying information to a registration authority;

storing a digital certificate that includes the public key associated with each user of the client device and the user identifying information if the registration authority verifies the identity of each user of the client device based on at least the provided user identifying information;

digitally signing the application with a second private key associated with the registration device; and providing at least some of the information about the identity and the public key upon request from another device to identify, authenticate, or provide integrity to a digitally signed data from the client device.

11. The system of claim 10, wherein providing the application to the client device, further comprises providing a click through agreement for acceptance of registration terms.

12. The system of claim 10, wherein the registration device is operative to perform actions, further comprising:

requesting verification of the information about the identity; and if the information about the identity is verified, digitally signing the information or the public key using an asymmetric key pair associated with the registration authority.

13. The system of claim 10, wherein the private key is bound to the client device by employing at least one of the following characteristics of the client device in the generation of the digital asymmetric key pair: a Central Processing Unit's (CPU's) kernel calculated speed for the client device, CPU serial number, CPU family identity, CPU manufacturer, an operating system globally unique identifier (GUID), a hardware component enumeration, a Internet Protocol (IP) address, a BIOS serial number, a disk serial number, a kernel version number, an operating system version number, an operating system build number, a machine name, an installed memory characteristic, a physical port enumeration, a customer supplied ID, or a MAC address.

14. The system of claim 10, wherein providing at least some of the information about the identity further comprises, digitally signing the information or the public key with an asymmetric key associated with the registration device.

15. The system of claim 10, wherein the identity is associated with at least one of a user, an organization, a device, or a group of devices.

16. An apparatus for binding an on-line identity to a digital signature, comprising:

means for generating, on the apparatus, a digital asymmetric key pair associated with each user of the apparatus, wherein the asymmetric key pair includes a private key and a public key, wherein the key pair are bound to the apparatus;

means for registering digitally signed information about an identity of a user associated with the apparatus, that includes user identifying information other than the public key, with a registration entity, wherein the information is digitally signed, at the apparatus, using the private key generated at the apparatus, wherein the digitally signed information and the public key are provided to the registration entity, and wherein the registration entity decrypts the digitally signed information using the public key, verifies at least some of the information with a data store, and digitally signs the information using a second private key associated with the registration device; and means for employing the registration device to provide at least the user identifying information to a registration authority;

means for employing the registration device to store a digital certificate that includes the public key associated with each user of the apparatus and the user identifying information if the registration authority verifies the identity of each user of the apparatus based on at least the provided user identifying information;

means for providing, from the apparatus, information to a third device enabling the third device to retrieve, from the registration device, the information digitally signed with the second private key to determine the identity.

* * * * *